United States Patent [19]
Crow

[11] Patent Number: 6,131,848
[45] Date of Patent: Oct. 17, 2000

[54] ROADABLE AIRPLANE DRIVE THROUGH AN AUTOMOTIVE TRANSAXLE

[76] Inventor: Steven Collins Crow, 31371 Shadow Mountain Dr., Conifer, Colo. 80433

[21] Appl. No.: 09/160,808

[22] Filed: Sep. 25, 1998

Related U.S. Application Data

[60] Provisional application No. 60/060,883, Oct. 2, 1997.
[51] Int. Cl.[7] .................................................. B64C 37/02
[52] U.S. Cl. ................................ 244/2; 244/50; 244/51; 244/60
[58] Field of Search .................................. 244/2, 50, 51, 244/60, 62

[56] References Cited

U.S. PATENT DOCUMENTS

| | | | |
|---|---|---|---|
| 2,562,490 | 7/1951 | Hall | 244/2 |
| 3,056,564 | 10/1962 | Zuck | 244/2 |
| 4,881,700 | 11/1989 | Sarh | 244/2 |
| 4,899,954 | 2/1990 | Prunszenski, Jr. | 244/2 |
| 5,050,817 | 9/1991 | Miller | 244/2 |
| 5,201,478 | 4/1993 | Wooley | 244/2 |
| 5,836,541 | 11/1998 | Pham | 244/2 |

OTHER PUBLICATIONS

Chiles, J.R., "Flying Cars were a Dream that Never Got Off the Ground", *Smithsonian*, vol. 19, No. 11, pp. 144–162, Feb.1989.

Grossmann, John, "Auto Pilots", *Air & Space*, vol. 10, No. 5, Jan. 1996.

Stiles, P., *Roadable Aircraft, from Wheels to Wings*, Second Edition, Custom Creativity, Inc., Melbourne, Florida, Aug. 1994 (copy not available).

*Primary Examiner*—J. Woodrow Eldred
*Attorney, Agent, or Firm*—Antonio R. Durando

[57] ABSTRACT

A roadable airplane consists of a single-seat three-wheeled vehicle with wing panels hung longitudinally on the sides of the chassis for road use and attached transversely to a spar box for flight. A power train is used that enables the simultaneous powering of two rear wheels and an overhead pusher propeller for transition from road to air travel. A transaxle for a four-wheel automotive vehicle was found to be advantageously suitable for this purpose. Multiple gears and differential outputs drive the wheels, providing a normal automotive performance on the road. Multiple gears are also available to drive the propeller, thereby providing the function of variable-pitch performance using a fixed-pitch propeller. The vehicle includes a standard automotive gear shift and pedal controls for clutch, brake and accelerator operation; a novel joystick assembly is used to steer the front wheel and to control wing flaps, an elevator and a rudder.

17 Claims, 17 Drawing Sheets

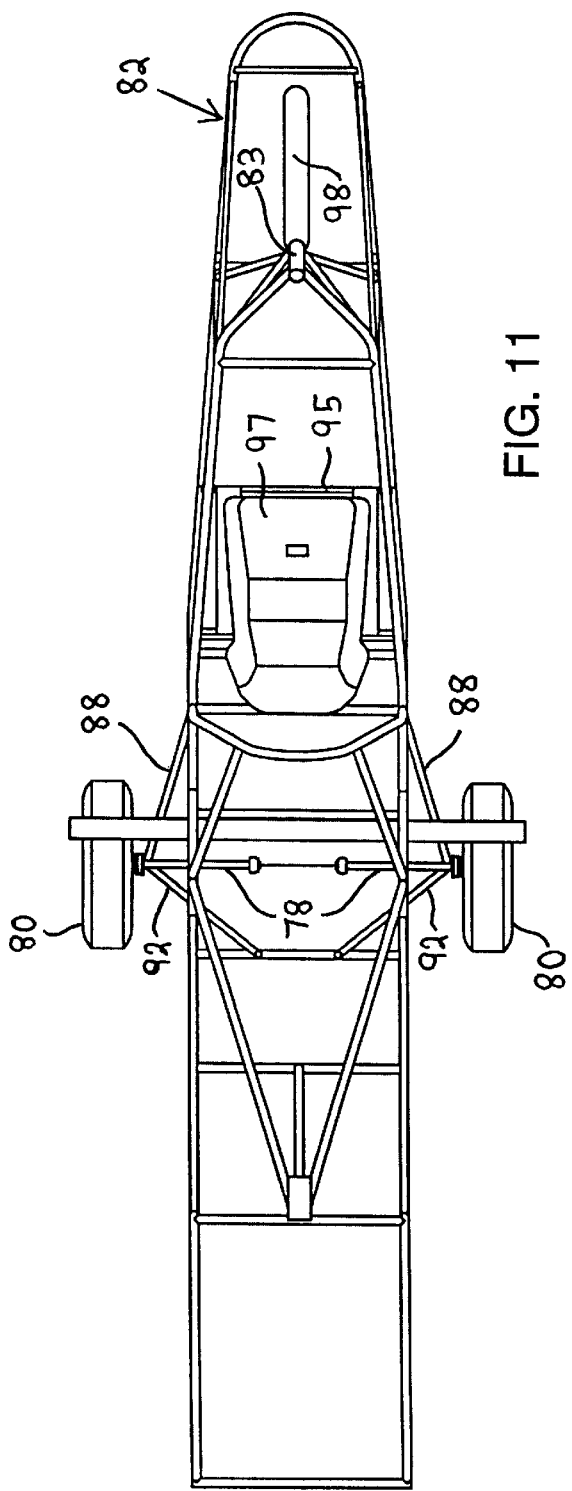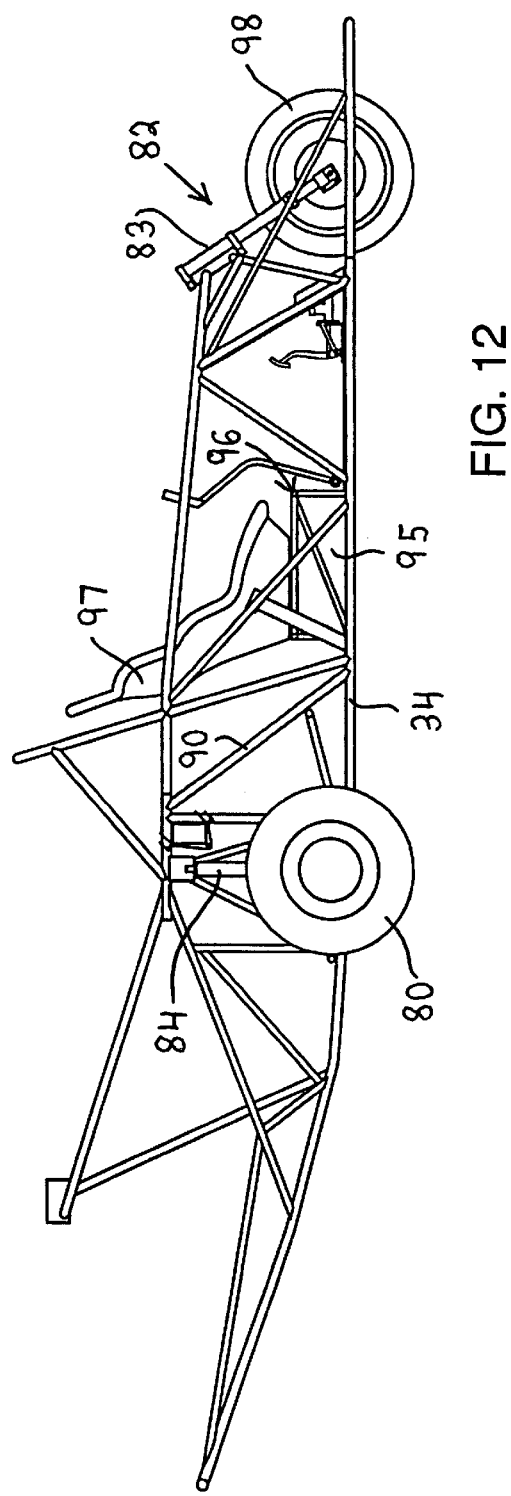

ROADABLE AIRPLANE DRIVE THROUGH AN AUTOMOTIVE TRANSAXLE

CROSS REFERENCES TO RELATED APPLICATIONS

This application is based on U.S. Provisional Application No. 60/060,883, entitled "Flying Car," filed by the same inventor on Oct. 2, 1997.

BACKGROUND OF THE INVENTION

1. Field of the Invention

In general this invention pertains to motor vehicles and aircraft. In particular, the invention relates to a flying vehicle with a power train configuration that attains the driving characteristics of a three-wheeled motorcycle and the flying attributes of a primary class airplane.

2. Description of the Prior Art

The idea of a flying car has had great appeal ever since automobiles and airplanes became accepted means of transportation. The concept is attractive as an engineering challenge as well as the fulfillment of a quest for total freedom and independence. Several authors have commented on the concept of a flying car and described various attempts at producing a viable machine for personal use. See, for example, Chiles, J. R., "Flying Cars were a Dream that Never Got Off the Ground," Smithsonian, Vol. 19, No. 11, pp.144–162, February 1989; Stiles, P., Roadable Aircraft, from Wheels to Wings, Second Edition, Custom Creativity, Inc., Melbourne, Fla., August 1994: and Grossmann, John, "Auto Pilots," Air & Space, Vol. 10, No. 5, January 1996.

As reported in these articles, the prior art abounds with concepts for flying cars that look and feel like cars on the road and somehow become airplanes for the sky. The common solution is a modular approach to provide both automotive and aircraft performance. Referred to as "transformers," these vehicles incorporate alternative modules that permit the conversion of a roadable car into a flying craft. This adaptation typically requires the vehicle to pass through an elaborate transformation where a sky module is added for flight.

A common objection to this type of flying cars is that they are poor airplanes as well as poor cars. In other words, the combination imposes excessive compromises on both the car and the airplane aspects of the vehicle.

Other types of flying vehicles have resulted from the adaptation of a conventional airplane to highway use, or that of a road vehicle to airborne use, but neither have produced a satisfactory compromise. The main problem has always been the lack of a single power train suitable for powering both a set of wheels and a propeller under conditions appropriate for each use. Obviously, road use requires multiple gears, including a reverse gear, while a propeller requires a single gear and, preferably, an adjustable pitch for transition between take off and cruise altitudes. For a roadable aircraft to become practically feasible, these features must be packaged in a light unit that is also relatively inexpensive to manufacture. The present invention discloses a novel combination of known components that satisfies these requirements.

SUMMARY OF THE INVENTION

One of the objectives of this invention is a self-contained vehicle capable of being operated either as a motor vehicle on the ground or as an airborne craft without any adaptation by the addition of specialized modules for each function.

Another objective of the invention is a vehicle that meets current standard regulations in the United States for motorcycle roadability and for certification as a primary class aircraft; that is, a roadable airplane.

Another goal is a vehicle that fits in an ordinary garage.

Another objective is a vehicle that utilizes the same motor, power train and controls on the road and in the sky.

Still another objective of the invention is an approach that affords flexibility of design, ease of repair, and efficient exploitation of existing technology.

Finally, another goal is a vehicle that can be manufactured at reasonable cost and is affordable to the general public.

Therefore, according to the foregoing objectives, the roadable airplane of the invention consists of a single-seat three-wheeled vehicle with wing panels hung longitudinally on the sides of the chassis for road use and attached transversely to a spar box for flight. The main aspect of the invention involves the use of a power train that enables the simultaneous powering of two rear wheels and an overhead pusher propeller for transition from road to air travel. A transaxle for a four-wheel automotive vehicle was found to be advantageously suitable for this purpose. Multiple gears and differential outputs drive the wheels, providing a normal automotive performance on the road. Multiple gears are also available to drive the propeller, thereby providing the function of variable-pitch performance using a fixed-pitch propeller. The vehicle includes a standard automotive gear shift and pedal controls for clutch, brake and accelerator operation; a novel joystick assembly is used to steer the front wheel and to control wing flaps, an elevator and a rudder.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiments and particularly pointed out in the claims. However, such drawings and description disclose only some of the various ways in which the invention may be practiced.

BRIEF DESCRIPTION OF THE DRAWINGS

FIG. 11 is a top view of the chassis of the invention showing two lateral differential outputs (without the propulsion assembly) used to power the rear wheels of the vehicle of the invention.

FIG. 12 is a side view corresponding to FIG. 11.

DETAILED DESCRIPTION OF THE INVENTION

As used in this disclosure, the term "four-wheel drive transaxle" refers to automotive transaxles with two differential outputs to half axles and a single output to a second axle. Some four-wheel drive transaxles provide two lateral differential outputs for the front wheels and a straight output connected to a separate rear differential for the rear wheels. The heart of this invention is the realization that this type of drive train, properly adapted with specifications suitable for an aircraft, makes it possible to achieve the development of a practically functional, affordable roadable airplane. In essence, the novel idea of utilizing the same motor and transaxle for simultaneously powering the wheels and propeller of the vehicle, and the fact that a suitable transaxle is available from the automotive industry, render the dream of a practical flying car possible.

Figure 2:
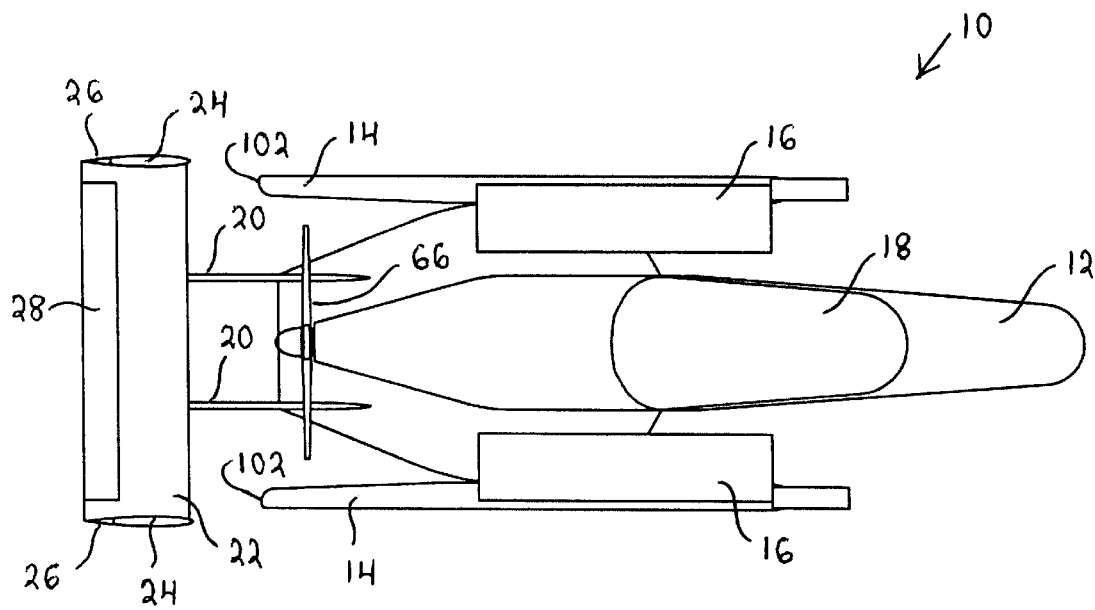
FIG. 2 is a schematic top view of the roadable airplane of FIG. 1.
Figure 1:
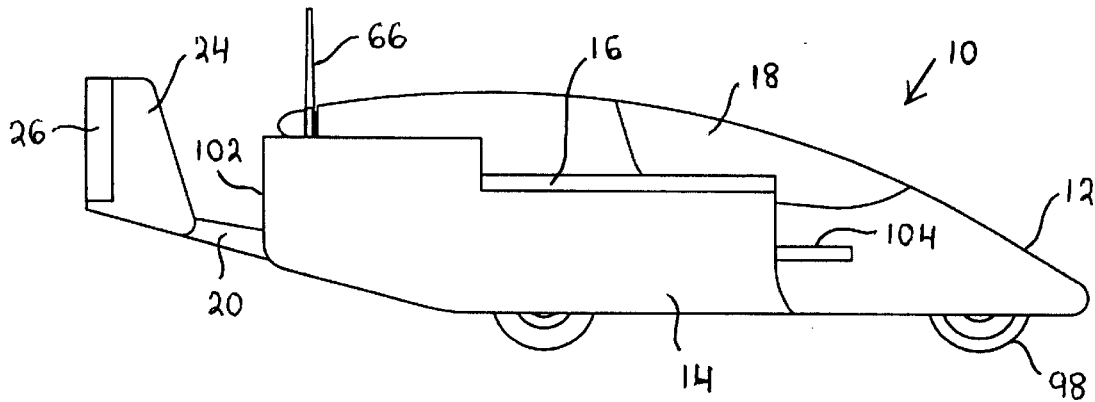
FIG. 1 is a schematic side-elevational view of the preferred embodiment of a roadable airplane according to the present invention.

Referring to the drawings, wherein like parts are designated throughout with like numerals and symbols, FIGS. 1 and 2 illustrate in schematic side-elevational and top views the preferred embodiment of a roadable airplane 10 according to the present invention. The vehicle 10 comprises an aerodynamic body or fuselage 12 built around a three-wheeled chassis equipped with all components necessary for flight and land operation. For road operation, two wings 14 are attached substantially longitudinally to the sides of the body of the vehicle 10, so as to provide minimum wind resistance to forward motion. The wing flaps 16 (which in fact are designed to provide the function of a flap/aileron combination) are preferably kept folded while the wings hang from the sides of the vehicle in order to maximize visibility from the cockpit through the canopy's windshield 18. The vehicle has no doors because it is low to the ground, and the driver/pilot can easily step over the side when the canopy is raised. Since a steering wheel would interfere with egress, steering on the ground is accomplished with a joystick also used to control roll and pitch in the air. Tail support booms 20 extend backward from the fuselage frame and support a horizontal tail 22 and two vertical fins 24. The horizontal tail 22 is low enough to lie under the fuselage wake during flight at high angles of attack. The vertical fins 24 serve as end plates to the tail 22, thereby increasing the effective tail span, as well understood in the art. Rudders 26 and an elevator 28 are provided in conventional configuration.

Figure 3:
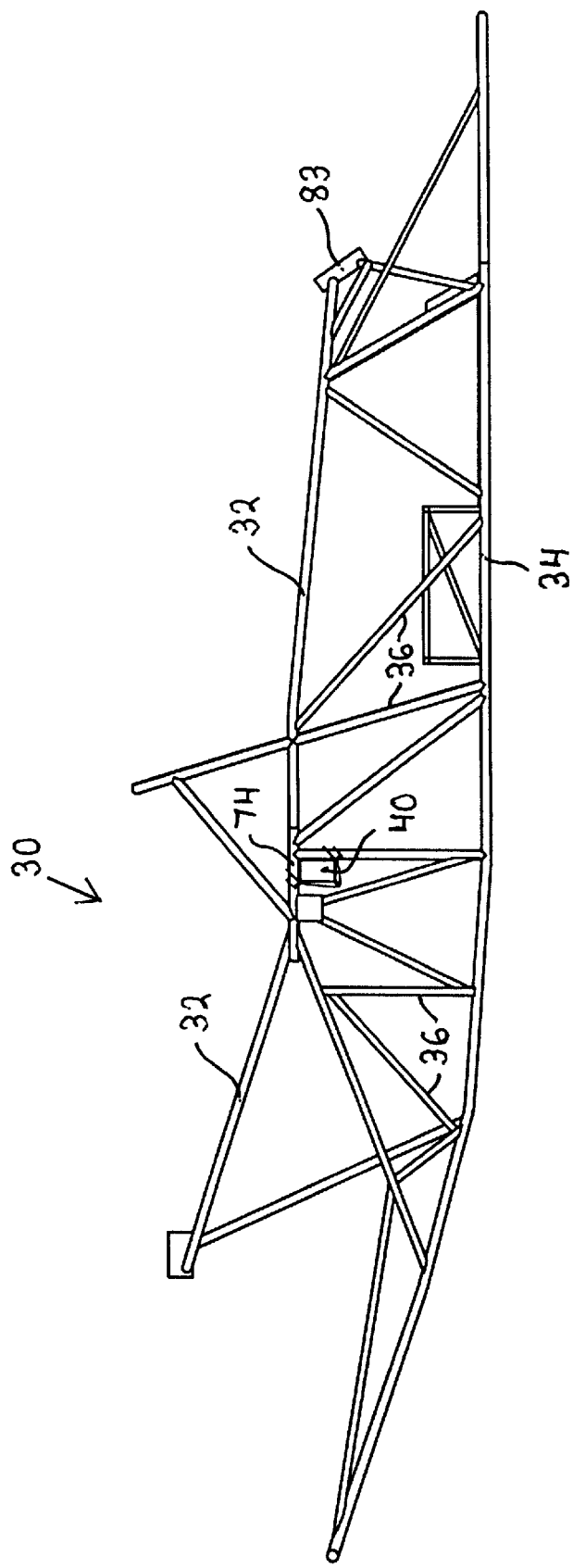
FIG. 3 is a schematic side-elevational view of the fuselage frame of the roadable airplane of FIG. 1.
Figure 4:
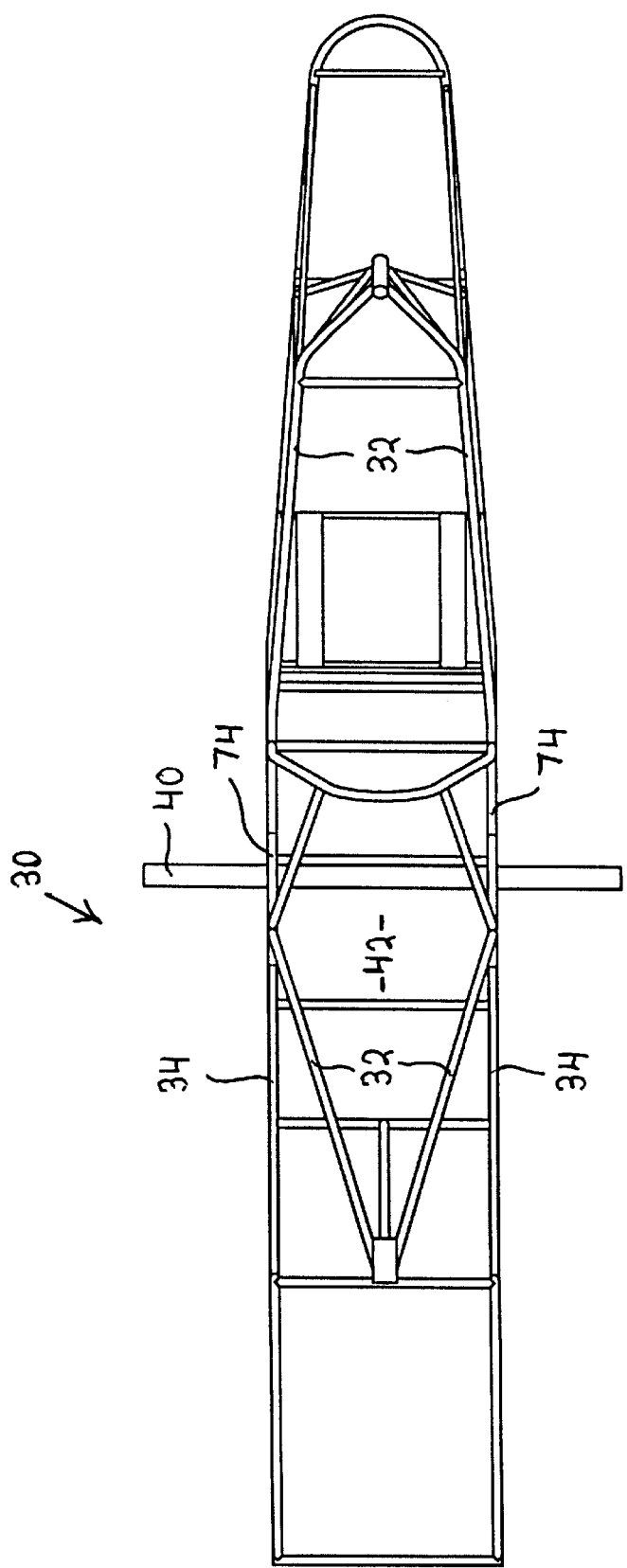
FIG. 4 is a schematic top view corresponding to FIG. 3.

FIGS. 3 and 4 show in side and top views the fuselage frame or chassis 30 of the vehicle 10 of the invention. The frame 30, which is the structural core of the vehicle, consists preferably of a chrome-moly steel tube frame. A steel tube structure was selected because it can accommodate various hard points intrinsic to a roadable airplane, such as a stem tube for a front wheel and suspension assembly, rear suspension links, spar box mounts, and a propeller bearing tube. Steel tube frames are also easy to design and relatively inexpensive to fabricate. In addition, chrome-moly tubes and an unloaded composite aeroshell are believed to be the lightest structural combination suitable to the objectives of the invention.

Figure 5:
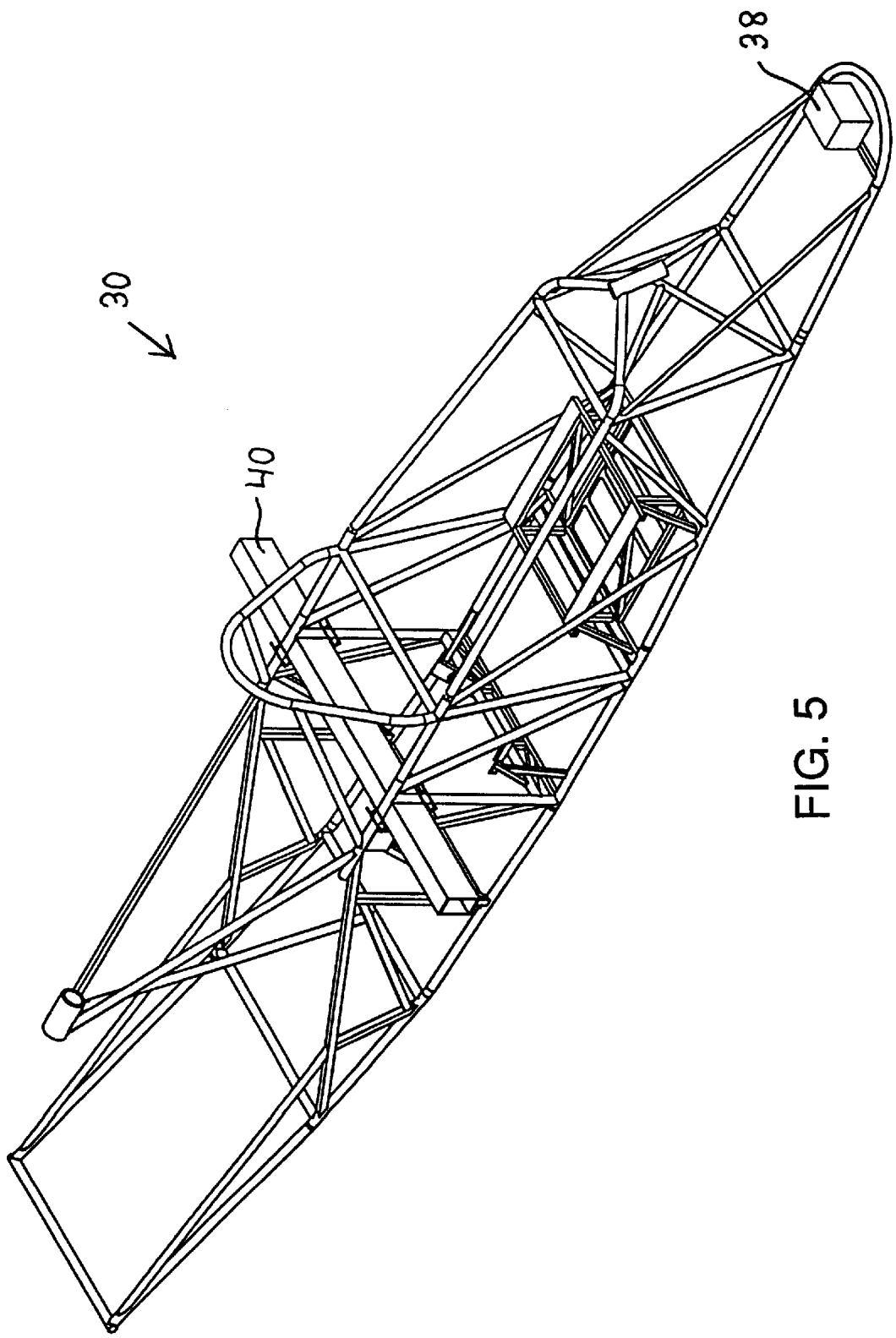
FIG. 5 is a perspective view of the fuselage frame of FIGS. 3 and 4.

To be safely operable, the frame 30 of the flying vehicle 10 must obviously be capable of withstanding high positive and negative loads. A planned prototype designed to withstand a positive load of 6.6 g's and a negative load of 3.3 g's is made of 4130 N steel alloy tubes, welded together by the tungsten inert gas (TIG) method. Round, square and rectangular tubes of several outer dimensions and thicknesses are used. The upper longerons 32, for example, consist of round tubes with 1.25 inch outer diameters and 0.049 inch thicknesses. The lower longerons 34 have the same outer diameters, but are 0.035 inches thick. Most of the substantially vertical struts 36 are 1 inch OD round tubes or 1 inch square tubes, 0.035 inches thick. The prototype frame is illustrated in perspective view in FIG. 5, wherein a battery 38 and a wing spar box 40 (also seen in FIGS. 3 and 4) are shown mounted in front and in the central section of the frame, respectively. The vehicles's dashboard, firewall, and cabin floor are not shown. The tubular frame shown in FIG. 5, without the battery and spar box, is estimated to weigh about 114.8 lbs.

Figure 6:
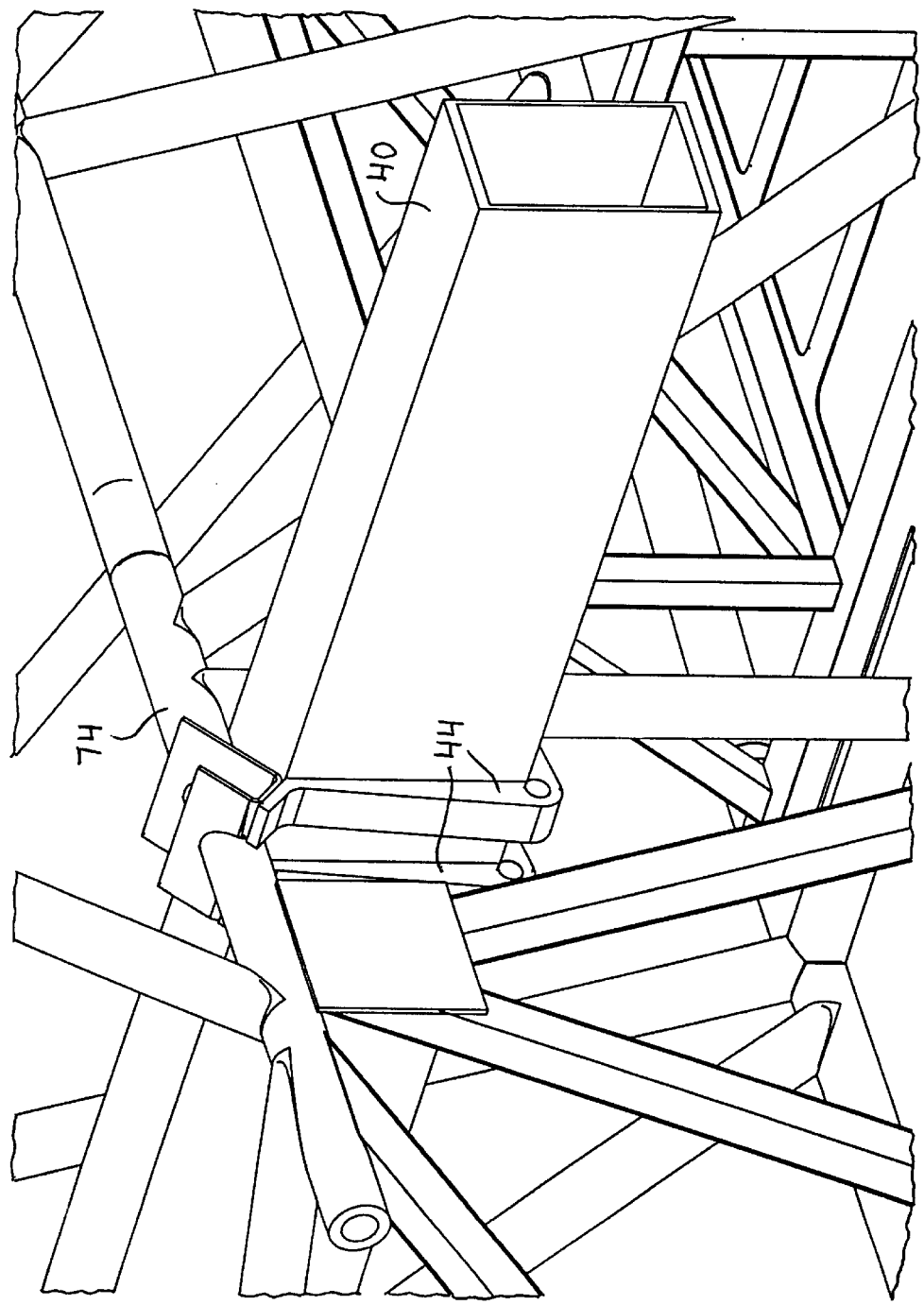
FIG. 6 is an enlarged partial view of the frame of the invention showing the connection of the spar box to the frame.

In order to allow for maximum flexibility and easy access to the motor compartment 42 (see FIG. 4), the spar box 40 is attached to the frame 30 by means of L-shaped aluminum clamps 44, as shown in FIG. 6. Since the spar box is preferably made of aluminum, it cannot be welded to the frame. Clamped as shown, the spar box can be conveniently removed to gain access to the motor and transaxle, which are mounted in the compartment 42. Aluminum saddles, not shown in the figures, separate the spar box from the tubes.

Figure 7:
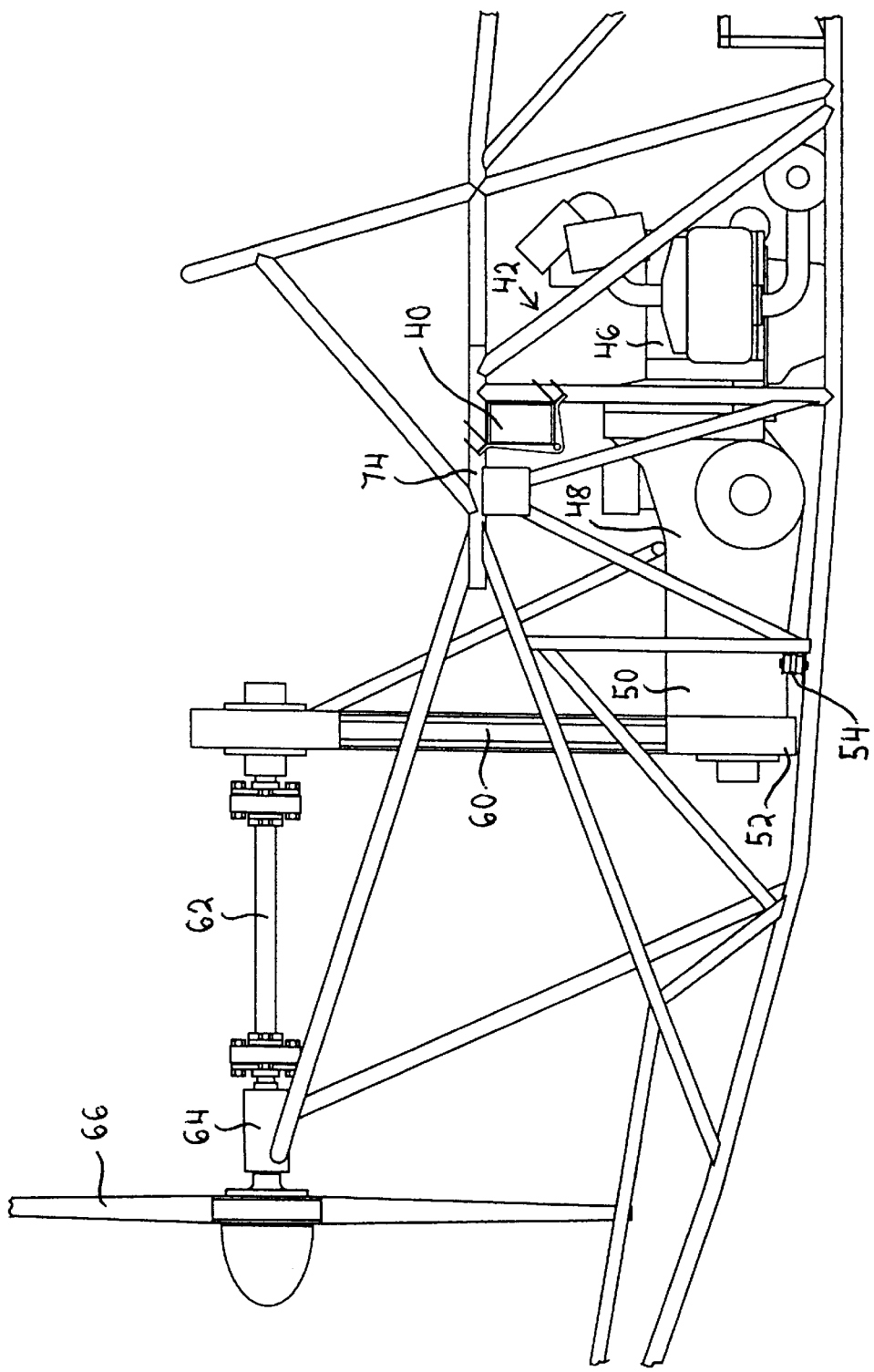
FIG. 7 is an enlarged partial view of the propulsion assembly compartment illustrating the motor, transaxle, transfer case, belt drive, and propeller installed in the chassis.
Figure 8:
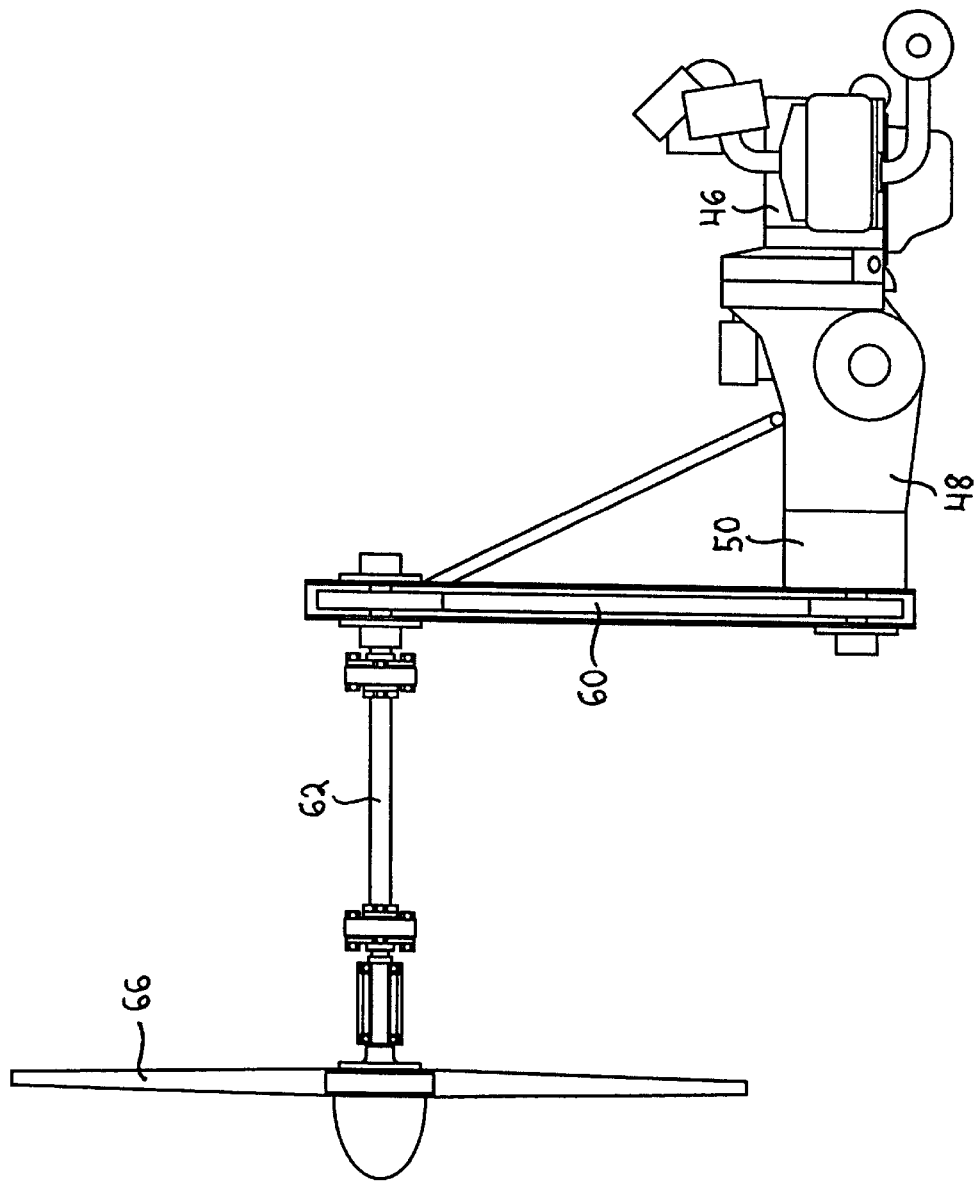
FIG. 8 is a stand alone picture of the propulsion assembly of the invention.

FIG. 7 illustrates in side view the propulsion assembly of the invention. A motor 46, a transaxle 48, a custom transfer case 50, and a belt drive 52 form a structural unit installed in the compartment 42 on soft mounts 54 and 56 (see also FIG. 9). The belt drive conveys power from the transaxle to a pusher propeller. Since it is known that such drives are prone to resonant torsional vibrations in the absence of a flywheel and is clutch, these components are retained in the drive train of the invention. Utilizing a belt 60 driven by the drive 52 coupled to the transaxle's rear output, the propulsion assembly is connected to a propeller shaft 62, which in turn (through elastomeric couplings shown in FIG. 8) is attached to a stub shaft inserted through bearings in a propeller bearing tube 64. A collar is splined to the aft end of the stub shaft, and the propeller hub is bolted to the collar. The propeller 66 is preferably a three-blade propeller with a diameter of 54 inches, as available from Warp Drive Inc. of Ventura, Iowa. The blade pitch is preferably adjustable while the vehicle is still on the ground, but it remains fixed in flight. The preferred embodiment of the invention is based on a Stratus EA81 engine, which is a Subaru EA81 engine converted for airplane use by Stratus, Inc., of Seattle, Wash., and a companion Gunma Manufacture 4WD4MT transaxle, as available in 1984 Subaru station wagons model 4WD-DL equipped with 1,800 cc engines. It is estimated that the whole propulsion assembly, as shown in FIG. 8, will weigh about 404 lbs, including the bearings but not the bearing tube 64, which is welded into the frame. The Stratus EA81 engine develops more than 100 hp at 5400 rpm and it is expected to deliver 100 hp to the propeller 66, which is sufficient for flight of an appropriately designed primary class aircraft. It is noted that the bell housing, the stock flywheel and clutch of the automotive engine are retained for the hybrid application of this invention.

Figure 9:
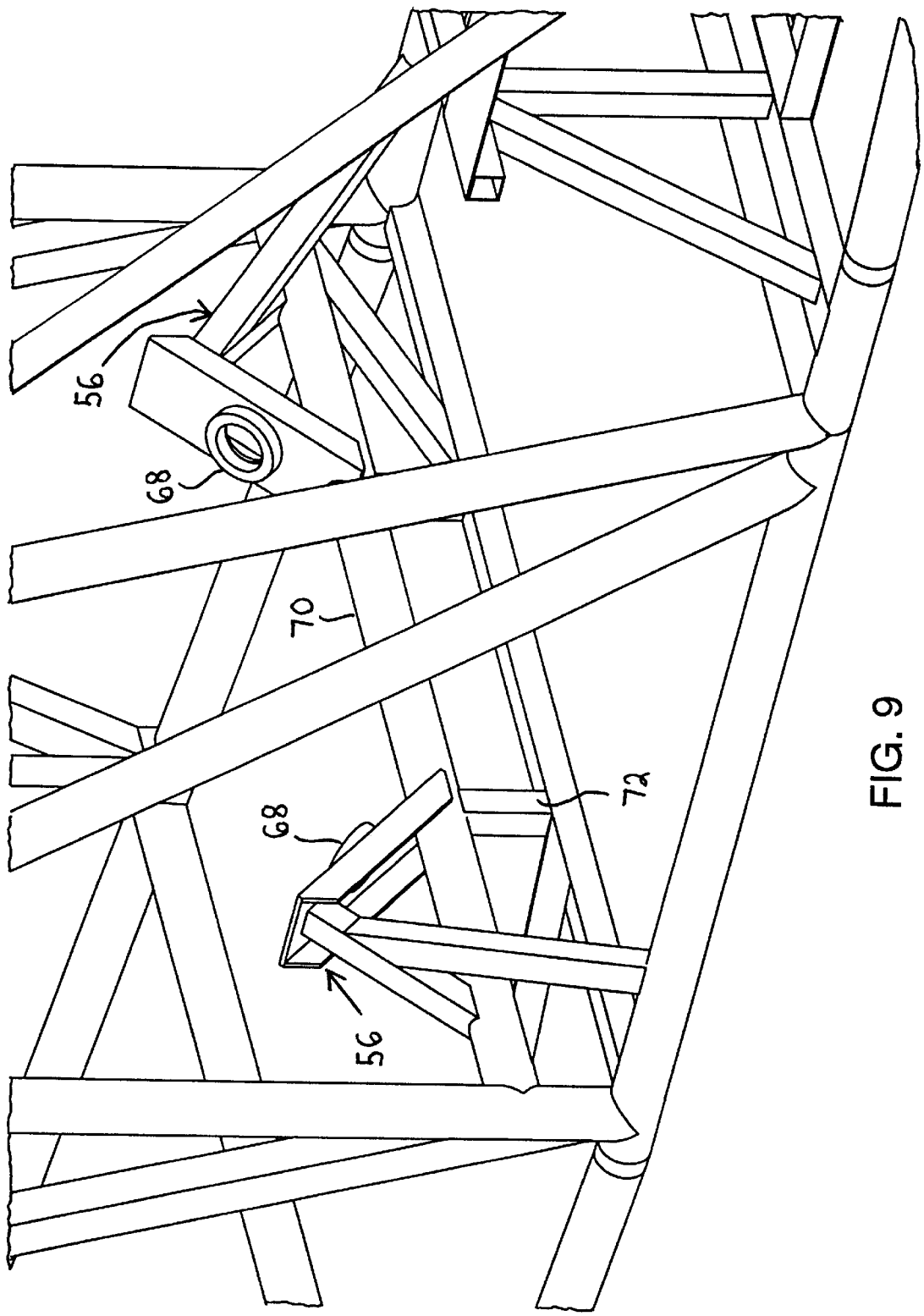
FIG. 9 is an enlarged partial view of the motor mounts in the chassis of the invention.

FIG. 9 shows the motor mounts 56 adopted for the vehicle 10 of the invention. The motor and transaxle rest on 45-degree rubber pads under the bell housing, which are bolted onto steel rings 68 on the motor mount. These pads are positioned slightly ahead of the center of gravity of the combined motor and transaxle. The pads preferably consist of two-piece Lord mounts, similar to those used in general aviation. The pads are bolted through alloy C-sections, welded to a lateral tube 70 with a 1.25 inch OD and a thickness of 0.049 inches. Square tubes 72 form a light truss on the bottom and brace the motor against fore and aft movement. The complete assembly weighs about 6 lbs. Tabs and Lord pads on the transfer case aft of the transaxle (shown as 54 in FIG. 7) complete the mounting subsystem.

Inasmuch as it consists of an automotive component, the transaxle 48 provides reverse plus four speeds forward, with an output shaft at the rear (the four-wheel drive output in automotive applications) that is used to drive the propeller 66. It is expected that the roadable airplane of the invention will takeoff in third gear, at a transaxle gear ratio of 1.193. The belted propeller-speed reduction unit provides a further ratio of 1.389, for a net speed reduction of 1.6571. Based on these reduction ratios, the motor speed at takeoff is expected to be about 5000 rpm, and the propeller speed about 3000 rpm.

Figure 10:
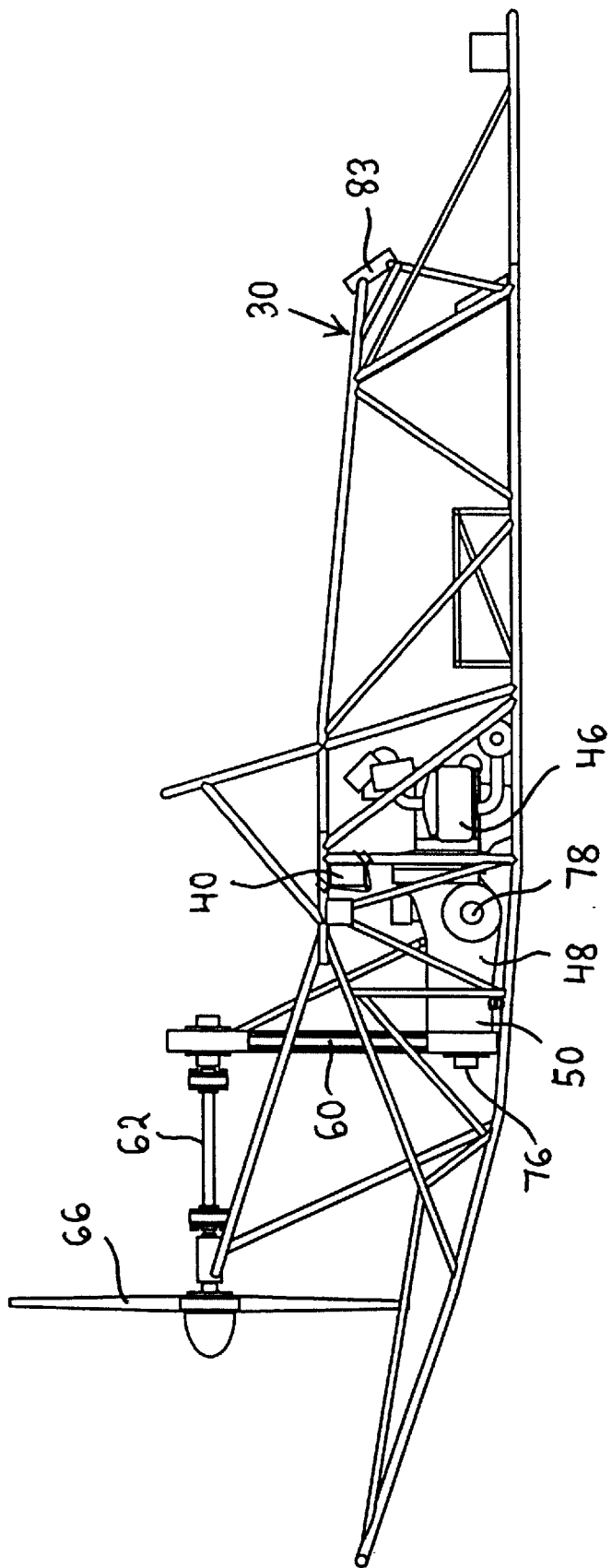
FIG. 10 shows in side view the propulsion assembly of the invention installed in the chassis.

It is estimated that the segment 74 of longeron just above the spar box 40 will experience an upward thrust of about 4000 lbs during a 6.6 g pull up. Thus, in order to prevent crushing, that segment is made of 1.25 inch OD alloy tube, 0.25 inches thick. As such, the tube segment 74 provides the necessary structural strength to the frame 30 at an additional weight of about 4.45 lbs. It is noted that the spar box assembly functions as a "shoulder" of the airplane and is a focus of extreme force. Another focus of force is the forward motor mount 56, which must withstand a download of about 2000 lbs during a 6.6 g pull up. The motor needs to be soft mounted and cannot be part of the support structure; so, the motor mount needs to be sturdy. FIG. 10 shows the propulsion assembly of the invention installed in the chassis 30. The transaxle 48 provides a rear output shaft 76 that is advantageously used to power the propeller 66, as described above, and two lateral differential outputs 78 used to power the rear wheels 80 of the vehicle (the wheel axles are seen in the top view of FIG. 11, which for clarity is shown without the propulsion assembly). Most of the running gear components utilized for the prototype of the invention are borrowed from existing components used in the motorcycle or automobile industries. The front end 82, also illustrated in FIG. 12, consists essentially of off-shelf components from a racing motorcycle except for the springs, which are selected to provide a 1.2 Hz bounce frequency considered optimal for the hybrid application of the invention. These components include the tire, wheel, axle, rotor, brake and caliper. While ordinary airplanes operate on smooth runways and can utilize small tires, a roadable airplane needs large tires to serve as filters between road irregularities and the chassis. Accordingly, the front tire of the vehicle 10 is a 24-in tire mounted on an 18-in motorcycle wheel, while in the rear tires are 24-in tires mounted on 14-in automobile wheels. The wheels and tires are chosen for the lowest possible combined weight. It is noted that the front end 82 is estimated to carry only about 181 lbs at maximum gross weight, considerably less than when used in a racing motorcycle. Using such available components, it is calculated that the complete front end 82 will weigh about 33 lbs excluding the stem tube 83, which is welded into the frame.

Figure 13:
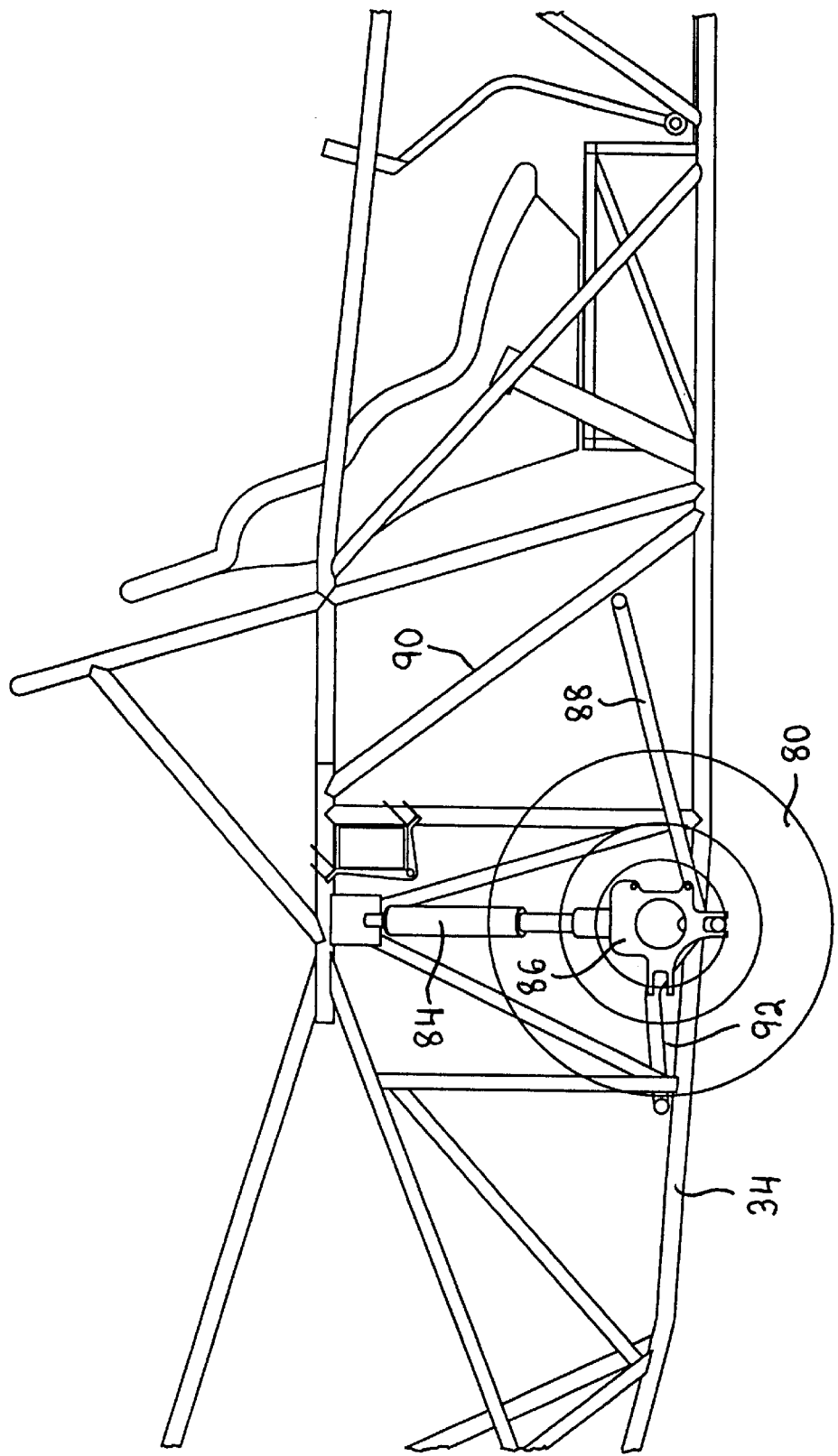
FIG. 13 is a partial, more detailed view of the rear-end configuration shown in FIG. 12.

In order to be acceptable within the objectives of the invention, the rear end of the vehicle 10 must provide conventional automotive attributes, including power transfer to the wheels and a smooth ride. In addition, the rear end must not protrude into the air stream below the smooth underpan of the vehicle and must be capable of absorbing the impact of a 10 ft/sec hard landing. Thus, both front and rear ends are designed to bounce at a frequency of 1.2 Hz. The struts 84 in the rear (FIG. 12) are oleo-pneumatic with no metal springs. They are of a type used for off-road vehicles and are used as McPherson struts in the vehicle 10. As seen more clearly in the enlarged view of FIG. 13, the struts 84 fit into custom axle carriers 86, which are CNC-machined from 6061-T6 aluminum. Lower wishbones 88 (see also FIG. 11) are connected to the motor bay diagonals 90 in front and the transaxle lateral in the rear. The rear links 92 of the wishbones have gull-wing shapes arching above the lower longerons 34 of the frame. The components of the rear end are estimated to weigh about 112 lbs, including wheels and tires.

Figure 14:
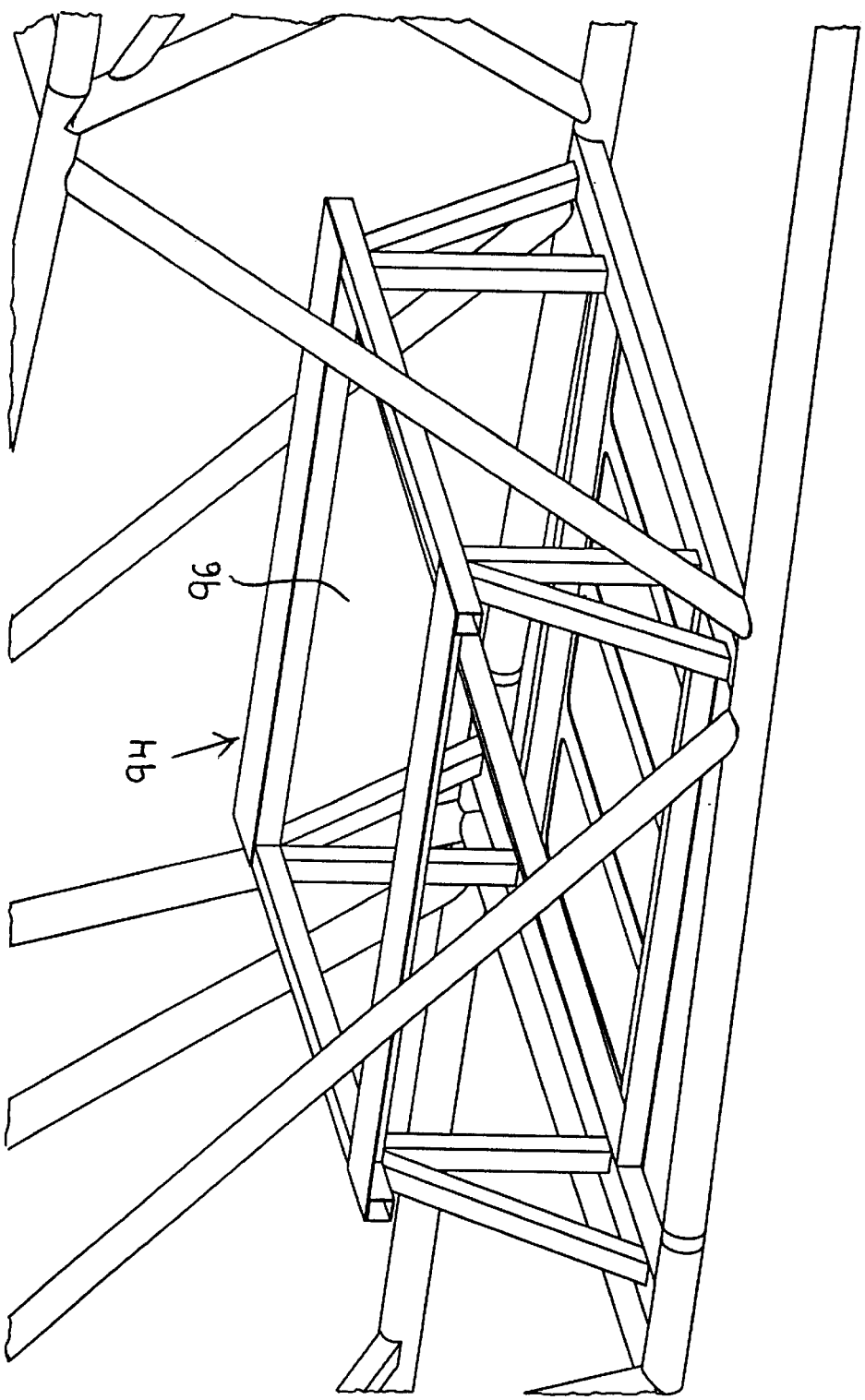
FIG. 14 is an enlarged partial view of the seat and fuel cell support structure in the chassis of the invention.

FIG. 14 illustrates a seat and fuel cell mount 94, which is another substructure that must be capable of handling high forces during extreme maneuvers. The design includes a fuel cell 95 (seen in FIGS. 11 and 12) lying in a compartment 96 directly under the seat 97 (see FIG. 12), so the frame around the fuel cell and under the seat mount are one and the same. The purpose and concept of the invention virtually require that the fuel cell be placed under the seat because safety considerations demand that it be located ahead of the firewall separating the seat from the motor. Moreover, given the convertibility aspects of the vehicle, the fuel cell should not reside in a wing because of the possibility of fuel leaks while the wing panels are being installed. Similarly, the cell could not be placed in the nose of the vehicle because it would cause large center-of-gravity shifts in flight and would be vulnerable to collisions on the ground. Thus, integration of seat mount and fuel cell frame is a solution that affords equal and high protection to both pilot and fuel. The vehicle is designed for a single seat to keep its weight within the 1200 lbs requirement for certification as a primary class airplane.

The preferred embodiment of the fuel cell 95 is not a conventional "tank," but rather a bladder similar to racing-car applications and built to National Hot Rod Association standards. Typically, such bladder is made of nylon rubber enclosed in an aluminum box and filled with foam to retard spillage and ignition. These bladders are designed to withstand a download of about 16,000 lbs and, therefore, can also serve as a cushion in the event of a very hard landing. Using a seat from the race car industry weighing approximately 13 lbs and a stock racing bladder weighing about 15 lbs dry with fittings, it is estimated that the complete seat and dry fuel tank assembly will weigh approximately 41.5 lbs, including the frame.

Figure 16:
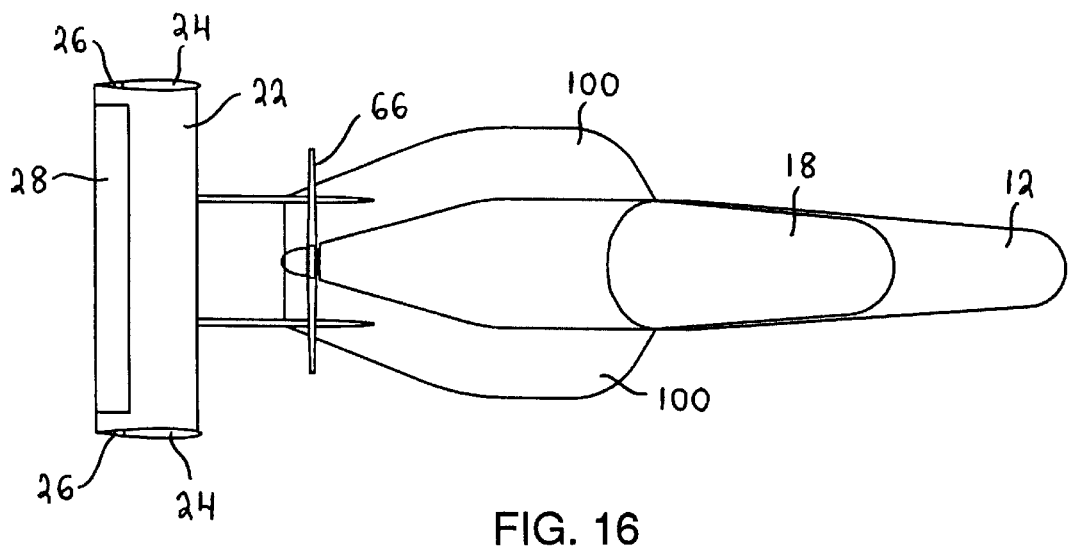
FIGS. 15 and 16 illustrate the vehicle of the invention in side and top views without wings.
Figure 15:
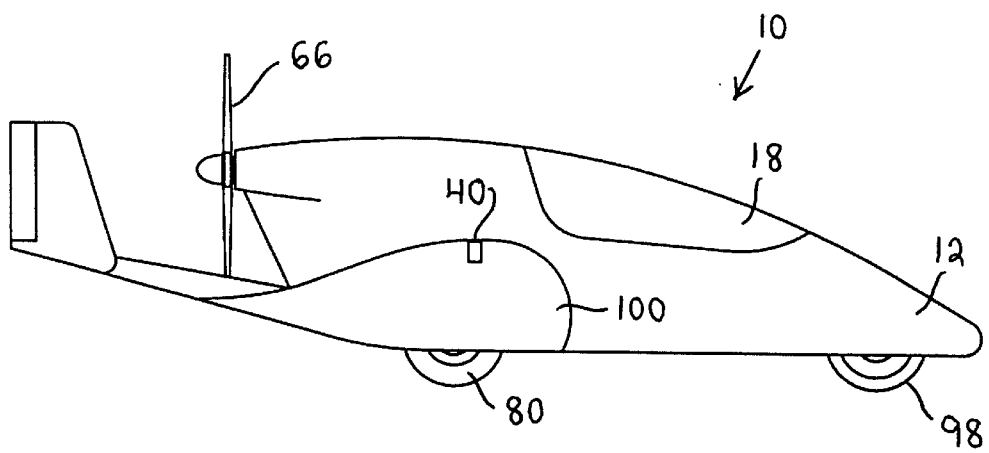

For road operation, the roadable airplane 10 of the invention is designed to look as a shrouded three-wheel motorcycle with wings hung on the sides, as shown in FIGS. 1 and 2. FIGS. 15 and 16 illustrate the vehicle 10 in side and top views without wings. The aircraft-type fuselage 12 covers the steerable front wheel 98 and rounded fenders 100 encase the rear traction wheels 80 to provide aerodynamic performance at high speed, both on the road and in the air. For road use, the wings 14 are either left behind or carried attached to the body of the vehicle 10, preferably by means of prongs 101 (see FIGS. 17 and 19) adapted to mate with the same spar box 40 used to support the wings for flight. When attached to the body of the vehicle, the tips 102 (back portion) of the wings 40 partially shroud the propeller 66, while the spar stubs 104 protrude forward on the side of the cockpit.

Figure 17:
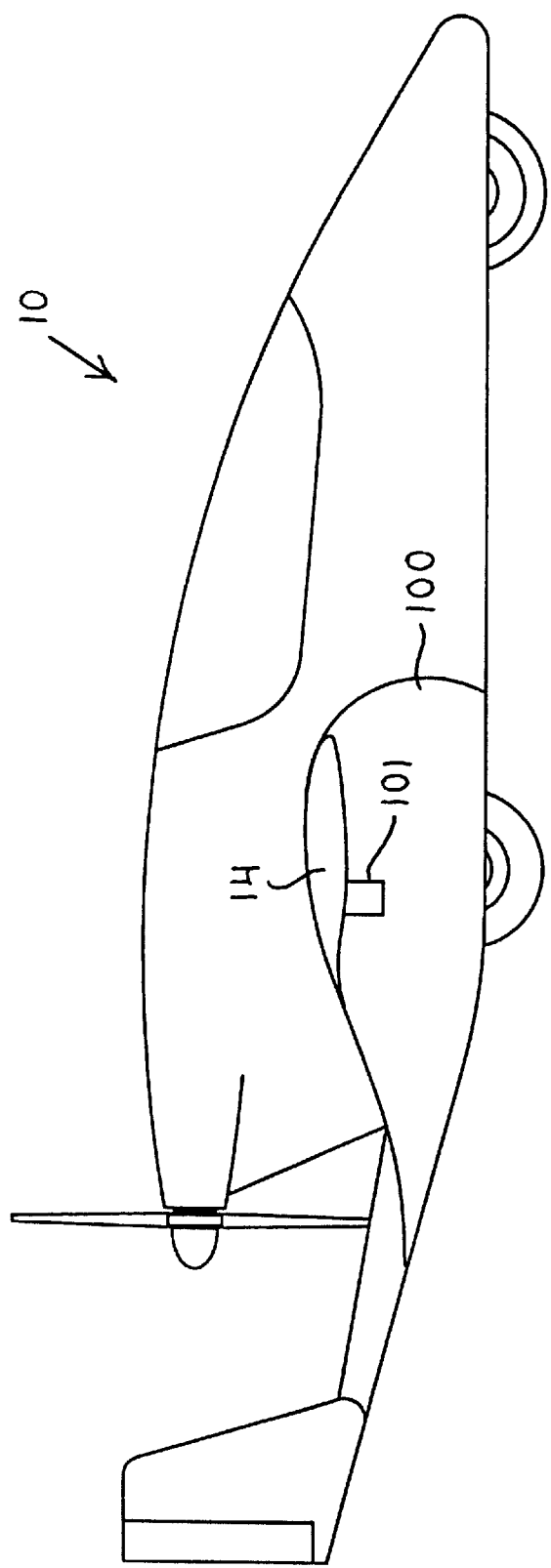
FIGS. 17–19 show three views of the roadable vehicle of the invention configured as an airplane.
Figure 18:
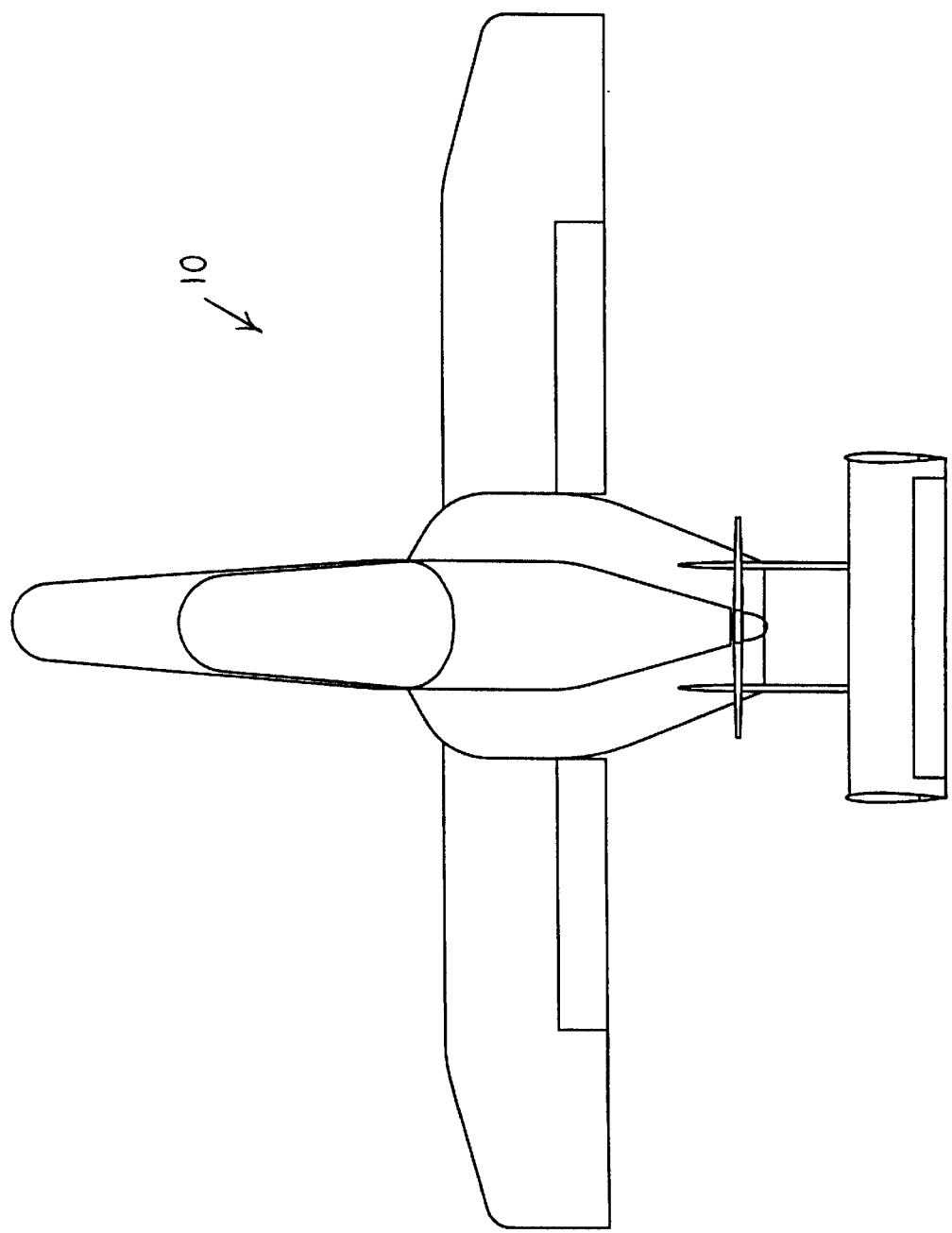
Figure 19:
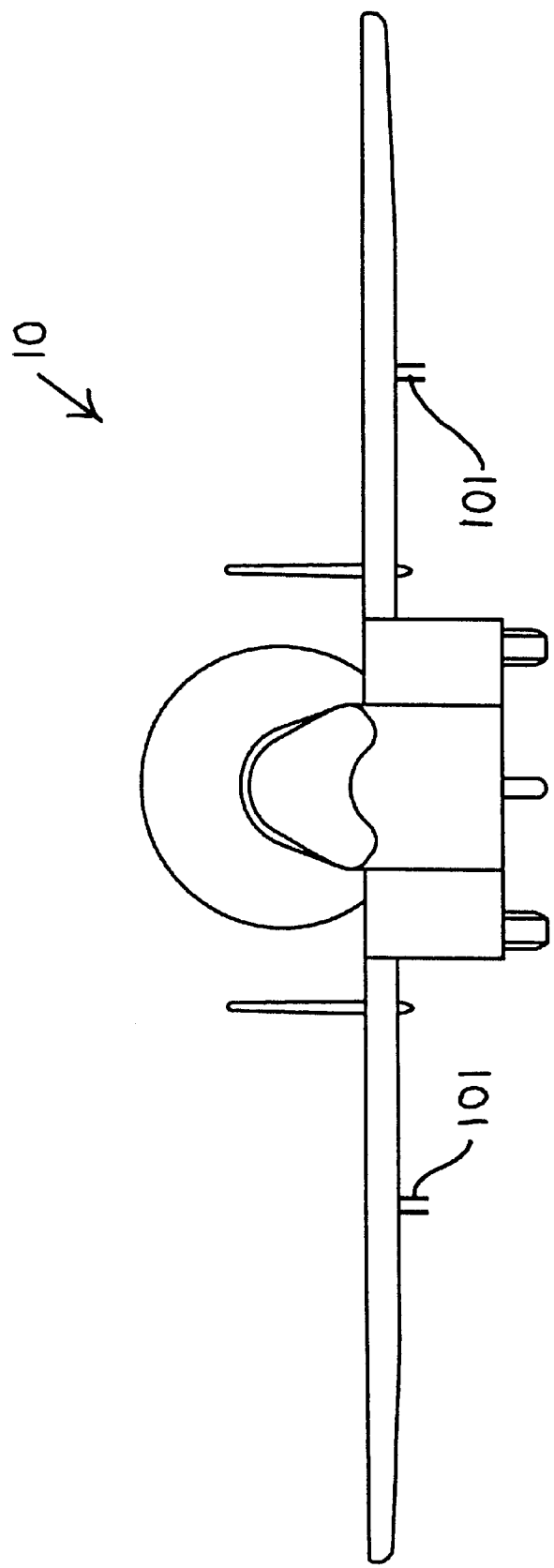

FIGS. 17–19 show three views of the roadable vehicle 10 of the invention as an airplane. As most evident from the side and plan views, the vehicle 10 has the same appearance of an airplane, specifically similar to a Fairchild Republic A-10A Thunderbolt, commonly known as the Warthog. The wing and tail configurations of the vehicle 10 are almost the same, as are their relative areas. The fenders 100 replace the twin turbofans of a Warthog. For optimal performance, the following key dimensions and surface areas have been selected for the preferred embodiment of the vehicle 10 described above:

| | |
|---|---|
| Length | 19 ft 2 in |
| Wing span | 25 ft |
| Horizontal tail span | 7 ft |
| Wing area | 81.4 sq ft |
| Horizontal tail area | 14.0 sq ft |
| Propeller diameter | 54 in |
| Road clearance | 8.5 in |
| Cabin length | 52 in |
| Cabin width (shoulder) | 28.75 in |
| Cabin height (seat to canopy) | 34 in |
| Canopy sill height | 33 in |

The generous cabin width is provided to facilitate the removal of the power plant from the motor bay, if necessary. The canopy sill height is measured from the ground under normal compression of the struts. This design requires the pilot to step over the canopy sill to enter the airplane, but the sill is low enough to pose no problem, even when the wings are hung on the sides.

The aerodynamic parameters corresponding to this design are calculated to be as follows:

| | |
|---|---|
| Parasite drag area | 3 sq ft |
| Parasite drag coefficient | 0.0368 |
| Wing aspect ratio | 7.68 |
| Wing span efficiency | 0.9 |
| Pitch stability margin | 0.1625 mac |

The vehicle's performance depends mostly on engine power, drag area, and the maximum lift coefficient of the wing. As mentioned, the Stratus EA81 engine selected for the prototype is expected to produce about 100 hp at the propeller. The drag area is estimated as 3 sq ft, and the maximum lift coefficient of the wings with flaps deflected is assumed to be 2.0, based on similar designs. The parasite drag area is a very conservatively assumed value. For example, the parasite drag area of a Lancair 320 is 1.4 sq ft. Thus, the higher value of 3 sq ft is assigned to the vehicle of the invention because of the wheel openings under the fuselage, but it is hoped that such openings can be faired to lower the drag area and correspondingly decrease the drag coefficient as well.

Based on aerodynamic calculations, the stick-fixed pitch stability margin is 16.25% of mean aerodynamic chord. The calculations include estimates of the fuselage pitch moment as well as effects of the fuselage and wing wakes on the tail. The airplane is expected to be highly stable but light enough that control force is unlikely to be a problem. The stability margin is purposefully high to allow for possible weight increases in the rear of the vehicle, if necessary, as often happens during final design of specific components of pusher propeller aircraft.

Another advantageous characteristic of the vehicle is its stability and control in side winds. The use of three rather than four wheels is convenient because the vehicle of the invention is considered a motorcycle for road use, therefore avoiding the most onerous of the automotive regulations. Moreover, a fourth wheel is not needed for stability. The center of gravity of the vehicle is low and close to the rear wheels (about 23 inches above the ground, not far above the roll center, with a roll factor of about 0.95 that assures the vehicle will skid before it overturns); therefore, a fourth wheel would afford little improvement in roll stability. Even with its three-wheel design, the vehicle's roll factor of 0.95 is comparable with that of modern sports utility vehicles. In addition, a single steerable front wheel is easier to cowl than two steerable side wheels.

Based on the components currently selected and the utilization of a layered graphite-epoxy/honeycomb-filler skin, about 0.20 inches thick, for the aeroshell; a 0.028-inch aluminum skin for the bottom of the craft (to allow radiation to cool the engine); and composite material, about 0.20 inches thick, for the wing panels; the major component groups of the vehicle 10, as described, are estimated to weigh as follows:

| Group | Weight (lbs) |
|---|---|
| Useful load | 230 |
| Propulsion | 404 |
| Rear end | 112 |
| Front end | 33 |
| Chassis | 191 |
| Wings panels | 100 |
| Aeroshell | 100 |
| Tail | 30 |
| Total | 1200 |

The allowed useful load of 230 lbs includes 170 lbs for the pilot and 60 lbs for 10 gallons of fuel. It is expected that some weight savings could be realized from surplus weight in the stock Subaru components, which are designed for much higher weights and torques than the vehicle of the invention will impose. For example, the transaxle 48 weighs about 80 lbs, about 70% of the frame weight, but it is a dual-range unit designed for high torque off road. Thus, some weight reduction could be obtained by adapting its structural parameters to the design requirements of the invention.

Based on these weights and the design characteristics of the vehicle, the following performance parameters are expected:

| | |
|---|---|
| Stall speed, flaps down | 56 mph |
| Stall speed, flaps up | 64 mph |
| Rotation speed | 71 mph |
| Takeoff speed | 75 mph |
| Sea level rate of climb | 995 fpm |
| Top speed | 150 mph |

As well understood in the art, the rotation speed is the minimum indicated air speed at which the horizontal tail can rotate the airplane under full power at maximum gross weight. The speed is rather high for the roadable aircraft of the invention because of the pitch-down moment of the propeller, but it is expected that the pilot will be able to rotate at a lower speed simply by taking his foot off the throttle.

Figure 20:
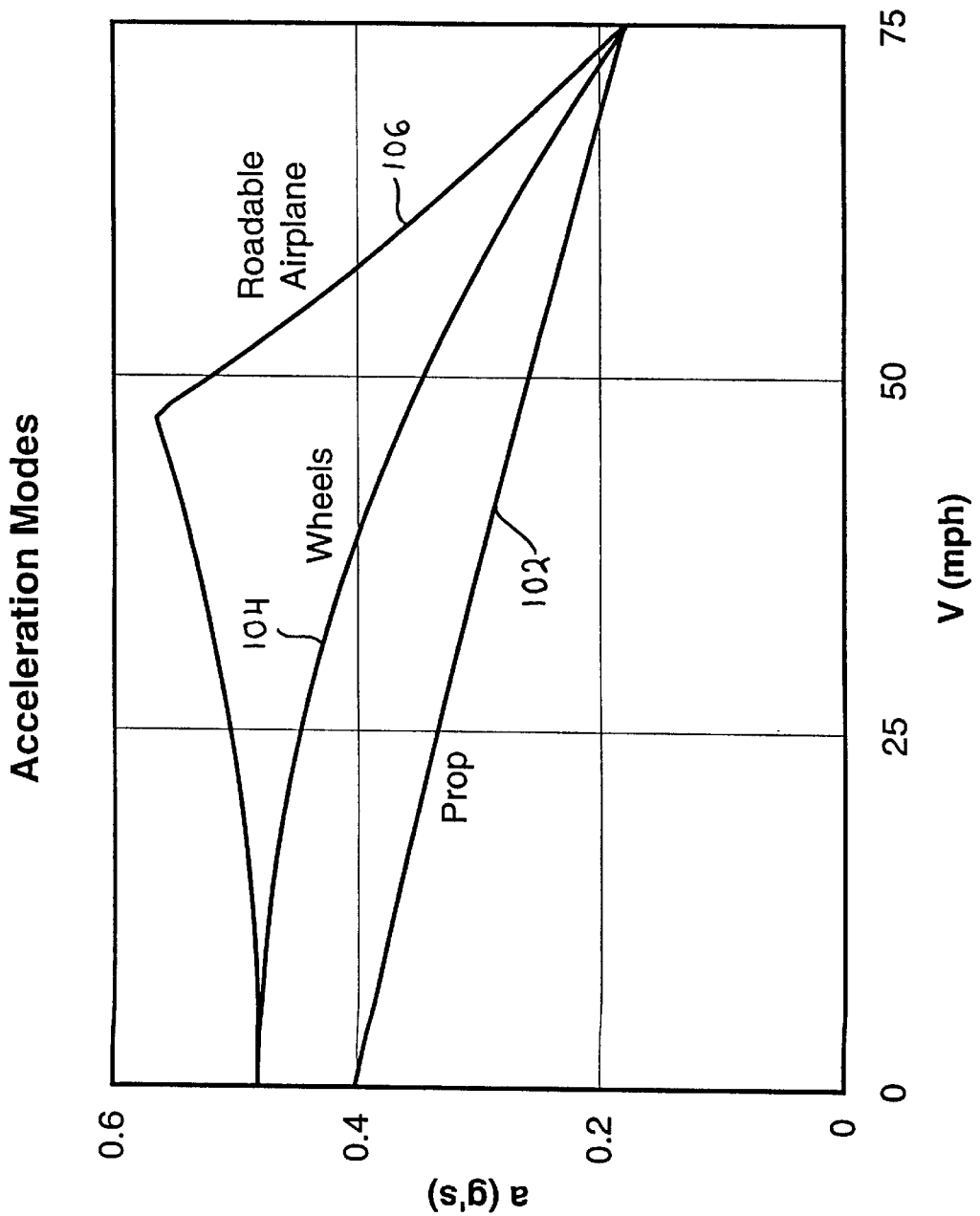
FIG. 20 is a graph of estimated acceleration-versus-speed profiles resulting from wheel, propeller and combined thrust.

Through the dual outputs of the transaxle 48, the rear wheels 80 and propeller 66 are coupled together so that the propeller absorbs full power at a takeoff speed of about 75 mph. Under propeller propulsion alone, the thrust at zero speed is estimated to be about 480 lbs, so the initial acceleration would be 480/1200 times gravity, or 0.4 g. Thrust and acceleration decline as the vehicle picks up speed, resulting in the acceleration profile 102 shown in FIG. 20. Thus, the acceleration is only about 0.18 g at 75 mph. The vehicle is estimated to take about 12.2 seconds and travel 760 ft to reach takeoff speed under propeller thrust alone.

Supposing the propeller were feathered for zero thrust and the rear wheels received full power (and the friction coefficient of the tires were 1.0), the torque available at low speed could provide an initial acceleration of about 1.0 g. Because the front end bears only about 180 lbs of weight when the vehicle is stationary, though, an attempt to accelerate at 1.0 g would lift the front wheel from the ground which, with some practice, would require a pilot to be able to control the throttle and clutch to retain an appreciable load, say 50 lbs, on the front end. The result would approximate the acceleration profile 104 in FIG. 20. Acceleration would start at about 0.48 g, but still decrease as the vehicle picked up speed, partly because the aerodynamic drag offloads the front end and partly because aerodynamic lift reduces traction. Thus, powered by wheels alone, the vehicle would attain the takeoff speed after a time of about 9.7 sec and a distance of 618 ft.

With the wheels and propeller coupled, the vehicle of the invention will receive thrust from both. Thrust from the wheels is expected to dominate at low speeds, with an initial acceleration of about 0.48 g when the load on the front end is about 50 lbs. Thrust rises as the square of speed; thus, as thrust rises, it will push the front end down and allow the pilot to apply more throttle, which will results in the approximate profile 106 shown in FIG. 20. The pilot would have the throttle to the floor at about 48 mph, and acceleration would decline inversely with speed thereafter. Under this scenario, the vehicle would reach takeoff speed after a time of about 8.2 sec and a distance of 510 ft. As a result of its novel dynamic characteristics, the roadable airplane of the invention is expected to reach zero to 60 mph in about 5.6 sec.

Given the hybrid design of the vehicle of the invention, most of the controls and functions needed for flight are also used on the road. The only exceptions while driving are the wing lift and roll controls, which are not available when the wings are not installed in the spar box. Similarly, with the exception of front wheel steering, all the road functions are also used in flight.

To operate the roadable airplane as a streamlined motorcycle, the driver raises the canopy and steps over the side into the cabin. The joystick is moved from side to side to steer the front wheel, while for and aft motion controls the elevator, and push buttons on the sides of the stick control the rudders. The actuation of all these components is achieved through servomechanisms well known in the art. A gear shift is positioned to the driver's right in conventional automotive fashion, and pedals for throttle, clutch and brakes are provided at his feet, just as in an automobile.

In operation, the transaxle's gears are engaged to power either the wheels only or also the propeller (the latter mode corresponding to four-wheel drive in automotive terminology); the driver releases a hand brake on his left, shifts into reverse, backs into the street, and pauses. The wheels are still, and so is the propeller. The driver shifts into first gear and accelerates carefully at first, since the nose is light and can lift under high acceleration. If connected, the propeller turns at about three times the rate of the wheels. In such case, the propeller is coupled to the rear wheels by the belt drive and always turns when they do.

As the vehicle picks up speed, the propeller, if engaged, develops thrust and pushes the nose down. At about 75 mph and above, the propeller absorbs all the power of the engine and the front wheel presses firmly on the ground. The driver can further load the nose by pushing forward on the stick to exploit the air flow on the elevator. Since power absorbed by the propeller varies as the cube of vehicle speed, at 37.5 mph the propeller will absorb only one eighth of the engine power and the fraction will rise to unity at about takeoff speed. Because of the configuration of the power train of the invention, no special means are needed to accomplish the power transfer from wheels to propeller. The transfer is entirely aerodynamic.

As well understood in the art, the sound power level of the propeller varies approximately as the sixth power of vehicle speed. Thus, the propeller is expected to be silent at idle and practically silent at normal highway speeds. At the takeoff speed of about 75 mph, the blade tips have a Mach number of 0.7, well below the speed of sound, and the sound power is expected to be modest even then.

To operate the vehicle as an airplane, obviously the wings have to be installed into the sides of the fuselage and the flap controls connected to it. The pilot accelerates through first and second gear, then holds the airplane in third gear until the engine speed is about 5000 rpm and the airspeed is about 75 mph. He then pulls back on the joystick to cause the vehicle to start flying. The airplane climbs in third gear until it reaches cruise altitude. The pilot then pushes forward on the stick and shifts into fourth gear as the flight path levels. Thus, through these shifts between gears, the transaxle of the invention provides the same function as a variable-pitch propeller, enabling the pilot to maximize engine power at various propeller speeds. In flight, the rear wheels rotate with the propeller and serve to buffer the propeller drive train from engine torsionals. Because the wheels have a much smaller angular momentum than the propeller, they have no appreciable gyroscopic effect on pitch and their effect on roll and yaw are expected to be hardly noticeable. To prepare for landing, the pilot eases the throttle pedal and may even downshift if he wants to increase the sink rate. He then depresses the clutch just before touchdown to allow the propeller and rear wheels to freewheel together and speed up as necessary when the wheels touch ground.

While the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

I claim:

1. A vehicle for road and air travel comprising the following components:

a roadable chassis including traction wheels and a pair of wings;

a motor mounted on the chassis;

a drive train coupled to an output shaft of the motor, said drive train comprising an automotive four-wheel drive transaxle; and a propeller mounted on the chassis such as to provide forward thrust;

wherein the propeller is coupled to a first output from the automotive four-wheel drive transaxle and the traction wheels are differentially coupled to a second output from the automotive four-wheel drive transaxle, the propeller being coupled to the traction wheels through the transaxle in a fixed gear ratio.

2. The vehicle of claim 1, wherein said automotive four-wheel drive transaxle comprises multiple forward gears and a reverse gear.

3. The vehicle of claim 1, wherein said propeller has a ground-adjustable pitch which is fixed in flight.

4. The vehicle of claim 1, wherein said propeller is a pusher propeller.

5. The vehicle of claim 1, wherein said propeller is an overhead pusher propeller.

6. The vehicle of claim 1, wherein said propeller has a ground-adjustable pitch which is fixed in flight.

7. The vehicle of claim 6, wherein said propeller is a pusher propeller.

8. The vehicle of claim 7, wherein said propeller is an overhead pusher propeller.

9. The vehicle of claim 1, wherein said traction wheels are two rear wheels and the vehicle further comprises a front wheel.

10. The vehicle of claim 9, wherein said front wheel is steered by a joystick.

11. The vehicle of claim 10, wherein said joystick is adapted to also control an elevator, a rudder and wing flaps.

12. The vehicle of claim 7, wherein said traction wheels are two rear wheels and the vehicle further comprises a front wheel.

13. The vehicle of claim 12, wherein said front wheel is steered by a joystick.

14. The vehicle of claim 13, wherein said joystick is adapted to also control an elevator, a rudder and wing flaps.

15. The vehicle of claim 1, wherein said wings are removably attached to the chassis.

16. A method of flying a vehicle including a roadable chassis with traction wheels, a motor mounted on the chassis, a propeller mounted on the chassis such as to provide forward thrust, an elevator and a rudder, said method comprising the following steps:

affixing a pair of wings to the chassis in an orientation suitable for flight;

providing a drive train coupled to an output shaft of the motor, said drive train comprising an automotive four-wheel drive transaxle having a first output coupled to the propeller and a second output differentially coupled to the traction wheels, the propeller being coupled to the traction wheels through the automotive four-wheel drive transaxle;

operating the vehicle such as to simultaneously power the traction wheels and the propeller coupled in a fixed gear ratio through the transaxle; and accelerating the vehicle to a takeoff speed and actuating the elevator to cause the vehicle to become airborne.

17. The method of claim 16, wherein said automotive four-wheel drive transaxle comprises multiple forward gears and the method further comprises the step of shifting gears during takeoff to maximize propeller and wheels thrust, and during flight in order to alter a ratio of motor-to-propeller speeds.

* * * * *